(12) United States Patent
Nechyba et al.

(10) Patent No.: US 8,515,139 B1
(45) Date of Patent: Aug. 20, 2013

(54) FACIAL FEATURE DETECTION

(75) Inventors: Michael Christian Nechyba, Pittsburgh, PA (US); Michael Andrew Sipe, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 75 days.

(21) Appl. No.: 13/421,668

(22) Filed: Mar. 15, 2012

(51) Int. Cl.
*G06K 9/00* (2006.01)

(52) U.S. Cl.
USPC .......................................... 382/118; 382/115

(58) Field of Classification Search
USPC .................. 382/115, 118; 351/204; 340/5.1, 340/5.92; 704/246
See application file for complete search history.

(56) References Cited

U.S. PATENT DOCUMENTS

| | | | |
|---|---|---|---|
| 6,356,649 B2 * | 3/2002 | Harkless et al. | 382/115 |
| 7,110,580 B2 * | 9/2006 | Bostrom | 382/124 |
| 7,222,072 B2 * | 5/2007 | Chang | 704/250 |
| 7,321,670 B2 * | 1/2008 | Yoon et al. | 382/118 |
| 2005/0063569 A1 | 3/2005 | Colbert et al. | |
| 2007/0122005 A1 | 5/2007 | Kage et al. | |
| 2008/0118113 A1 | 5/2008 | Jung et al. | |
| 2011/0157347 A1 * | 6/2011 | Kalocsai | 348/78 |

OTHER PUBLICATIONS

Kumar et al., "Attribute and Simile Classifiers for Face Verification," IEEE 12th International Conference, Kyoto, Japan, Sep. 29, -Oct. 2, 2009, pp. 365-372.
Lin et al., "Face Recognition/Detection by Probabilistic Decision-Based Neural Network," IEEE Transactions on Neural Networks, vol. 8, No. 1, Jan. 1997, pp. 114-132.
Turk et al., "Eigenfaces for Recognition," Journal of Cognitive Neuroscience, vol. 3, No. 1, 1991, pp. 71-86.
Office Action From Korean patent application No. 10-2013-0027801, dated May 30, 2013, 6 pages.
Examination Report from Australian patent application No. 2013201778, dated May 24, 2013, 4 pages.
Combined Search and Examination Report from British patent application No. 1304775.8, dated Apr. 11, 2013, 7 pages.

* cited by examiner

*Primary Examiner* — Edward Park
(74) *Attorney, Agent, or Firm* — Shumaker & Sieffert, P.A.

(57) ABSTRACT

An example method includes capturing, by a camera of a computing device, an image including at least a face of a user, calculating a face template of the face of the user in the image, and analyzing the face template to determine whether the face includes at least one of a removable facial feature that decreases a level of distinctiveness between two faces and a non-removable facial feature that decreases a level of distinctiveness between two faces. When the face includes the removable facial feature, the method further includes outputting a notification for the user to remove the removable facial feature. When the face includes the non-removable facial feature, the method further includes adjusting a first similarity score threshold to a second similarity score threshold.

21 Claims, 7 Drawing Sheets

FACIAL FEATURE DETECTION

GOVERNMENT LICENSE RIGHTS

This disclosure was made with government support under RDECOM contract W911NF-10-C-0028 awarded by Intelligence Advanced Research Projects Activity (IARPA). The government may have certain rights in the invention.

TECHNICAL FIELD

This disclosure relates to facial recognition technology, and more specifically, to the detection of facial features of images captured for use in facial recognition.

BACKGROUND

A user may activate or otherwise gain access to functionalities of a computing device by "unlocking" the device. In some instances, a computing device may be configured to permit unlocking based on authentication information provided by the user. Authentication information may take various forms, including alphanumeric passcodes, gestures, and biometric information. Examples of biometric information include fingerprints, retina scans, speech, and facial images. A computing device may authenticate a facial image input using facial recognition technology.

SUMMARY

In one example, a method includes capturing, by a computing device, an image including at least a face of a user, and calculating, by the computing device, a face template of the face of the user in the image. The method further includes analyzing, by the computing device, the face template to determine whether the face includes at least one of a removable facial feature that decreases a level of distinctiveness between two faces and a non-removable facial feature that decreases a level of distinctiveness between two faces. When the face includes the removable facial feature, the method further includes outputting, by the computing device, a notification for the user to remove the removable facial feature. When the face includes the non-removable facial feature, the method further includes adjusting, by the computing device, a first similarity score threshold to a second similarity score threshold.

In another example, a computer-readable storage medium includes instructions for causing at least one processor of a computing device to perform operations. The operations include capturing an image including at least a face of a user, and calculating a face template of the face of the user in the image. The operations further include analyzing the face template to determine whether the face includes at least one of a removable facial feature that decreases a level of distinctiveness between two faces and a non-removable facial feature that decreases a level of distinctiveness between two faces. When the face includes the removable facial feature, the operations further include outputting a notification for the user to remove the removable facial feature. When the face includes the non-removable facial feature, the operations further include adjusting a first similarity score threshold to a second similarity score threshold.

In another example, a device includes at least one processor, at least one camera operable by the at least one processor to capture an image, and at least one output device. The at least one processor is configured to analyze the first face template to determine whether the face includes at least one of a removable facial feature that decreases a level of distinctiveness between two faces and a non-removable facial feature that decreases a level of distinctiveness between two faces, wherein when the face includes the removable facial feature, the at least one output device is configured to output a notification for the user to remove the removable facial feature, and wherein when the face includes the non-removable facial feature, the method comprises adjusting a first similarity score threshold to a second similarity score threshold.

In another example, a method includes capturing, by a computing device, an image including at least a face of a user, and calculating, by the computing device, a face template of the face of the user in the image. The method further includes analyzing, by the computing device, the face template to determine whether the face includes a removable facial feature that decreases a level of distinctiveness between two faces. When the face includes the removable facial feature, the method further includes outputting, by the computing device, a notification for the user to remove the removable facial feature The details of one or more examples are set forth in the accompanying drawings and the description below. Other features, objects, and advantages will be apparent from the description and drawings, and from the claims.

DETAILED DESCRIPTION

Figure 1:
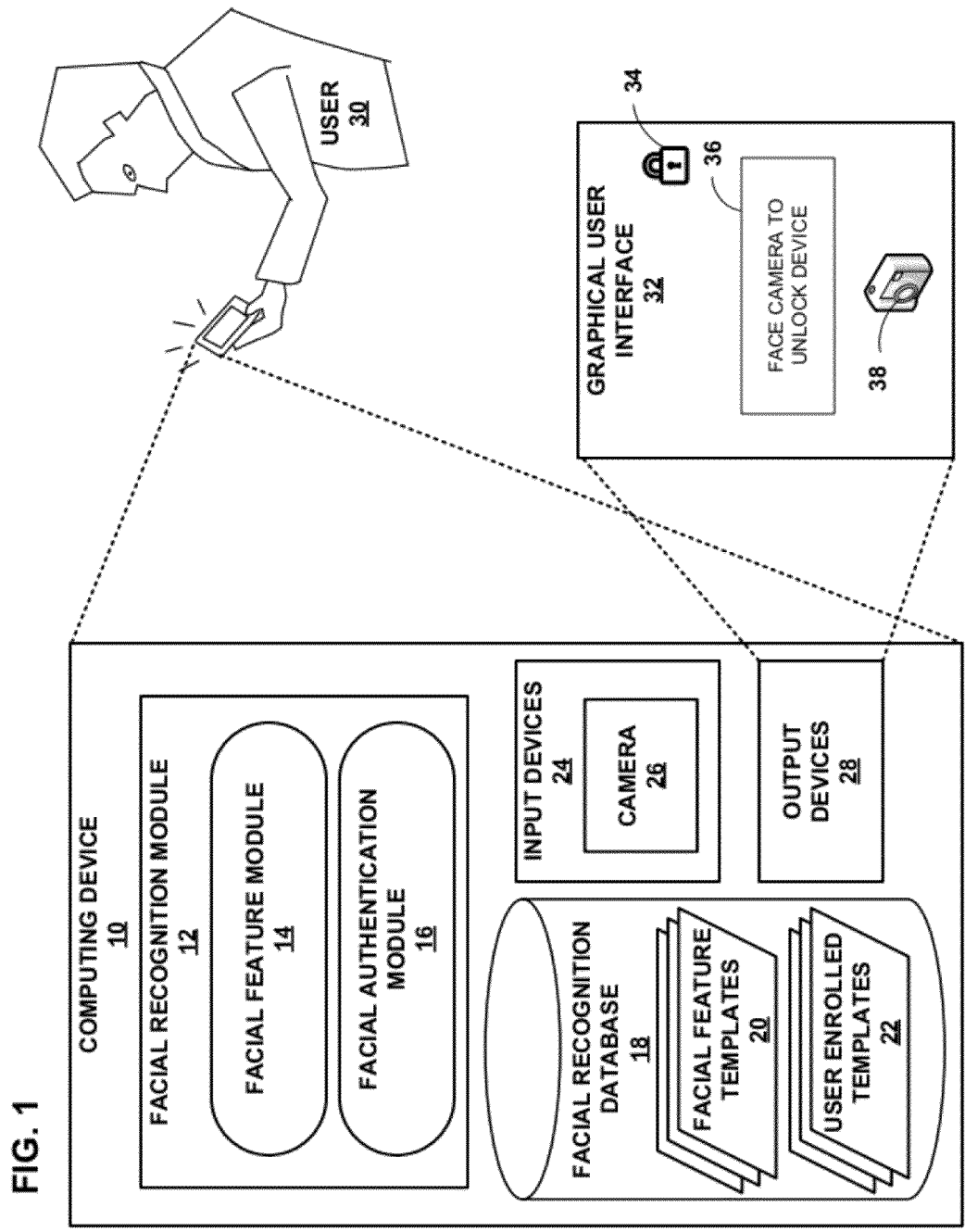
FIG. 1 is a conceptual diagram illustrating an example computing device that detects facial features that may decrease a level of distinctiveness between two faces during facial recognition, in accordance with one or more aspects of the present disclosure.

A computing device may use facial recognition programs in various scenarios. For example, a computing device may use facial recognition programs to authenticate a user who attempts to gain access to one or more functionalities of the computing device or functionalities otherwise controlled by the computing device. In some common scenarios, a computing device may store templates (or "enrolled templates") calculated from images of faces of one or more authorized users (or "enrollment images"). When a user attempts to gain access to functionalities of (or "unlock") the computing device, the computing device may capture an image of the user's face for authentication purposes. The computing device may calculate a template of the captured facial image and use facial recognition techniques (e.g., a facial recognition program) to compare the template of the captured facial image to the enrolled templates associated with authorized users. If the facial recognition programs determine an acceptable level of match between the template and at least one enrolled template, the computing device may authenticate the user, and grant the access request.

Generally, a facial recognition system may authenticate a user and grant the user access to functionalities of the computing device by comparing facial features of the captured facial image to facial features of the enrollment images associated with authorized users. If the facial features of the captured facial image are similar enough to the facial features of one of the enrollment images, the user is authorized to access functionalities of the computing device. Similarity between facial features may be quantified using a similarity score, with higher similarity scores denoting greater degrees of similarity. If a similarity score in comparing facial features of two images is greater than a similarity score threshold, the facial features of the two images may be deemed a match.

However, authentication by facial recognition may not function as intended in some instances. For example, certain facial features such as sunglasses and facial hair may cause authentication by facial recognition to fail. As discussed herein, an example of such a failure is denying a user a match even when the user is an authorized user. Another example of such a failure is granting a user a match where the user is not an authorized user.

Authorized users may become frustrated if they are denied access to the computing device in which they are in fact an authorized user. Additionally, unauthorized users may leverage vulnerabilities of facial recognition programs to cause erroneous authentication. For example, an unauthorized user may attempt to unlock a computing device by attempting to appear less distinct. Appearing less distinct may cause a facial recognition system to deem a captured image of an unauthorized user a match to one of the enrolled images associated with authorized users.

In some examples, facial features that may decrease a level of distinctiveness between users may be any facial feature that increases a similarity score between two otherwise distinct users. In other words, a facial feature that may decrease distinctiveness between users is a facial feature that causes a similarity score for two images having distinct people to increase because of the facial feature. In some examples, facial features that may decrease a level of distinctiveness between users may be classified into two categories: removable facial features and non-removable facial features. For example, removable facial features that may decrease a level of distinctiveness between users may include, but is not limited to, objects such as sunglasses, head gear (e.g., hats), and other objects that may obstruct a portion of a user's face. Additionally, non-removable facial features that may decrease a level of distinctiveness between users may include, but is not limited to, facial hair. Examples of facial hair include goatees, sideburns, mustaches, beards, and costume (e.g., fake) facial hair. Non-removable facial features may include features that are not readily removable, such as due to being physically attached to a user, but that can ultimately be removed with additional effort (e.g., by actions such as shaving of facial hair).

In some examples, eyes of a user may be one of the more distinguishing features between users. A user wearing sunglasses obscures the eyes and thus may reduce a level of distinctiveness between users. Additionally, facial hair may conceal or obscure various distinguishing features of a user and thus may reduce a level of distinctiveness between users. That is, two otherwise distinct users may tend to look more similar when wearing sunglasses and/or having facial hair.

In some examples, an unauthorized user having either the removable and/or non-removable facial features may gain erroneous access to a computing device. For example, a facial recognition system may calculate a similarity score that is above a similarity score threshold for a captured imaged of the unauthorized user and enable the unauthorized user access to the computing device. Therefore, unauthorized users may attempt to appear less distinct to gain access to functionalities of the computing device to overcome authentication constraints otherwise implemented by the computing device.

In general, the present disclosure is directed to techniques for preventing facial recognition failure by analyzing a face template calculated from a captured image for removable facial features and non-removable facial features that may decrease a level of distinctiveness between two otherwise distinct images. In some examples, the techniques may be performed by programs (e.g., facial recognition programs) executing on the computing device that may detect the removable and non-removable facial features that may decrease a level of distinctiveness between two faces. Detecting the removable and non-removable facial features may decrease instances of erroneous authentication and/or decrease instances of an authorized user being denied access to the computing device.

In one example, when a removable facial feature is detected in the face template, the facial recognition programs may stop the facial recognition authentication process and generate a notification prompting the user to remove the removable facial feature. In some examples, the notification may instruct the user to capture a subsequent image (e.g., an image without the removable facial feature) for facial recognition authentication. In another example, when a non-removable facial feature is detected, the facial recognition programs may increase a similarity score threshold to an adjusted similarity score threshold. In some examples, the facial recognition programs may generate a notification indicating that the security is increased and prompting the user to select whether or not to continue with the facial recognition. In some examples, adjusting (e.g. increasing) the similarity score threshold may offset the decrease in the level of distinctiveness between a captured image and an enrolled image by the non-removable facial feature.

In another example, removable facial features and non-removable facial features that may decrease a level of distinctiveness between two faces may be detected during an enrollment process. For example, when a removable facial feature and/or a non-removable facial feature is detected in a potential enrollment template calculated from an enrollment image, the facial recognition program may provide a notification indicating that the potential enrollment template includes the removable and/or non-removable facial feature. Additionally, the facial recognition program may adjust the similarity score threshold for the enrollment template that includes the removable and/or non-removable facial feature. In other examples, the facial recognition programs may prevent the enrollment template from being stored as an enrollment template of an authorized user and prompt the user to capture another picture for enrollment purposes.

The facial recognition programs of this disclosure may reduce the chances of an unauthorized user causing erroneous authentication by attempting to appear less distinct and reducing the chances of authorized users being denied access. For example, the facial recognition programs may deny authentication to a user if the object of the facial image includes the removable facial feature (e.g., sunglasses) that may decrease a level of distinctiveness. In another example, the facial recognition programs may adjust the security level (e.g., increase a similarity score threshold) if the object of the facial image includes the non-removable facial features (e.g., a beard) that may decrease a level of distinctiveness. In this manner, techniques of the present disclosure may detect facial features that may decrease a level of distinctiveness between two faces. Additionally, facial recognition results may be improved by preventing potential enrollment templates including removable facial features and/or non-removable facial features from being stored as enrollment templates.

FIG. 1 is a conceptual diagram illustrating an example computing device that detects facial features that may decrease a level of distinctiveness between two faces during facial recognition, in accordance with one or more aspects of the present disclosure. FIG. 1 illustrates computing device 10 that may capture a facial image associated with a user (e.g., user 30) and detect whether the captured facial image includes a facial feature that may decrease a level of distinctiveness between two faces during facial recognition. In the example of FIG. 1, user 30 may hold computing device 10 (e.g., a mobile computing device) that may perform facial recognition based on one or more images of user 30 captured by computing device 10. Computing device 10 may include, be, or be part of one or more of a variety of types of devices, such as a mobile phone (including so-called "smartphones"), tablet computer, netbook, laptop, desktop, personal digital assistant ("PDA"), set-top box, television, and/or watch, among others.

Computing device 10 includes one or more input devices 24, at least one of which is a camera 26. Camera 26 may be part of or coupled to a front-facing camera of computing device 10. In other examples, camera 26 may be part of or coupled to a rear-facing camera of computing device 10. One or both of the front-facing and rear-facing cameras may be capable of capturing still images, video, or both.

In the example of FIG. 1, computing device 10 further includes output devices 28. At least one of output devices 28 may display a graphical user interface (GUI) 32. GUI 32 may be displayed by a variety of display devices, including input/output capable devices such as a touchscreen or presence-sensitive displays. In various examples, computing device 10 may cause one or more of output devices 28 to update GUI 32 to include different user interface controls, text, images, or other graphical contents. Displaying or updating GUI 32 may generally refer to the process of causing one or more of output device 28 to change the contents of GUI 32, which may be displayed to the user.

In the example of FIG. 1, user 30 may not currently be authenticated with computing device 10. However, user 30 may wish to authenticate with computing device 10. User 30 may authenticate with computing device 10 using facial recognition techniques. GUI 32 may display graphical information related to authenticating a user to computing device 10 using facial recognition according to the techniques of this disclosure. As shown in the example of FIG. 1, GUI 32 may include one or more GUI elements, such as lock indicator 34, unlock prompt 36, and capture icon 38.

Computing device 10 may be configured to operate in a "locked" mode, represented by the presence of lock indicator 34. In some examples, a user may actively configure computing device 10 to operate in locked mode. For example, prior to entering the locked mode, the user may press a button (e.g., a lock button) or icon presented by computing device 10 for a predetermined length of time to request computing device 10 to operate in locked mode. In these and other examples, a user may tap, swipe, or otherwise interact with one or more elements of GUI 32, using output device 28 (e.g., a presence-sensitive screen) of computing device 10. Computing device 10 may also be configured to operate in locked mode by passive means. For example, a predetermined period of "inactivity" may configure computing device 10 to operate in locked mode. Inactivity may occur due to an absence of user interaction (e.g., through button presses, contact with input devices 24 and/or output devices 28, etc.). The predetermined time period that configures computing device 10 to operate in locked mode may be a default time period specified by a manufacturer of computing device 10, or may be programmed by an authorized user, such as user 30.

In some examples, computing device 10 may utilize facial recognition technology to stop operation in the locked mode. In other words, user 30 may "unlock" computing device 10 by authentication methods that use facial recognition techniques to determine whether user 30 is an authorized user of computing device 10. More specifically, user 30 may enroll with a facial recognition application or embedded process of computing device 10 by storing one or more user enrolled template 22 (e.g., templates calculated from enrollment images) that represent the face of user 30. User 30 may cause camera 26 of computing device 10 to capture one or more user enrollment images. Computing device 10 may calculate user enrolled templates 22 from the user enrollment images and store the one or more user enrolled templates 22 to one or more storage devices of computing device 10 (e.g., facial recognition database 18), and/or to a remote location, commonly known as "cloud storage" for later use during facial recognition.

To unlock computing device 10 using facial recognition technology, user 30 may provide an authentication image that represents at least a portion of his/her face. In some examples, user 30 may actively cause camera 26 of computing device 10 to capture the authentication image. For example, user 30 may face a camera lens associated with camera 26 and press a button to cause camera 26 to capture the authentication image. In another example, user 30 may tap, swipe, or otherwise interact with an area associated with capture icon 38 included in GUI 32. In still other examples, computing device 10 may automatically capture the authentication image in response to user 30 facing a camera lens associated with camera 26. As shown in the example of FIG. 1, computing device 10 may display GUI 32 to include unlock prompt 36. In this example, unlock prompt 36 indicates that user 30 may simply face camera 26, which may include or be otherwise coupled to a camera lens, to cause computing device 10 to capture the authentication image.

As shown in FIG. 1, computing device 10 may also include facial recognition module 12 and facial recognition database 18. In one example, facial recognition module 12 may determine whether an authentication image for facial recognition includes a removable facial feature that may decrease a level of distinctiveness between two users and/or a non-removable facial feature the decreases a level of distinctiveness between two users.

Figure 2:
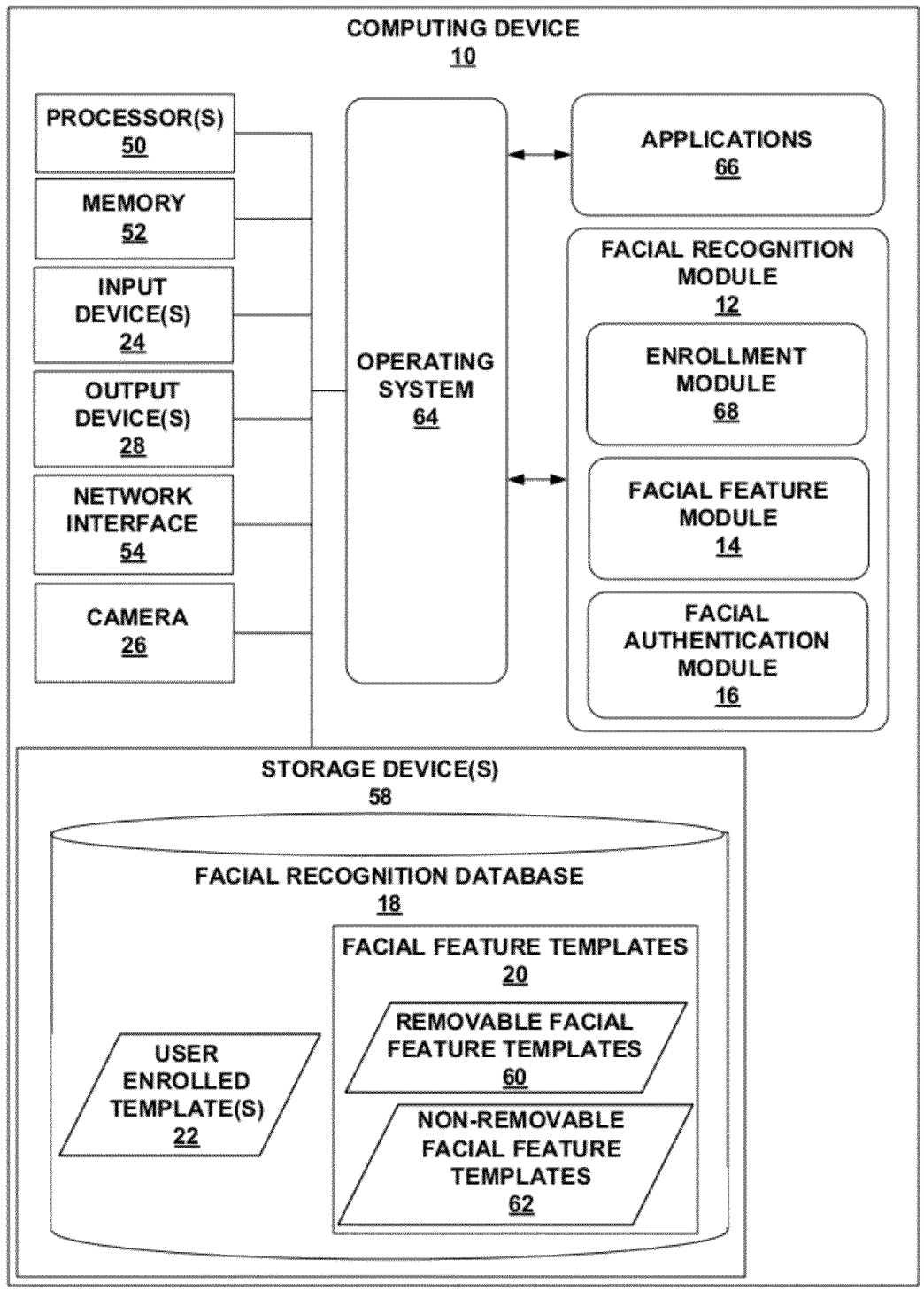
FIG. 2 is a block diagram illustrating details of an example computing device for detecting facial features that may decrease a level of distinctiveness between two faces during facial recognition, in accordance with one or more aspects of the present disclosure.

In some examples, facial recognition database 18 may comprise a logical and/or physical location (e.g., a logical location that references a particular physical location) of one or more of storage devices or memory (e.g., storage devices 58 and memory 52 illustrated in FIG. 2). In some examples, facial recognition database 18 may comprise a directory or file of a file system, a database, or a sector or block of a hard disk drive, solid state drive, or flash memory. In an example, facial recognition database 18 may also reside at least partially in memory 52 of computing device 10 (e.g. if the images of facial recognition database 18 are cached for later write through to one or more of storage device 58).

In one example, after computing device 10 captures the authentication image and calculates an authentication face template from the authentication image, facial recognition module 12 may begin a facial recognition process. In some examples, the facial recognition process may occur in two phases: a facial feature detection phase and an authentication phase. During the facial feature detection phase, facial feature module 14 may determine whether or not the authentication image includes one of the removable and/or non-removable facial features that may decrease a level of distinctness between two users.

As discussed herein, facial feature module 14 may compare the authentication face template calculated from the authentication image of user 30 with a plurality of facial feature templates 20 stored in facial recognition database 18 to determine whether or not the authentication face template includes a removable and/or non-removable facial feature that may decrease a level of distinctiveness between two users. For example, facial recognition module 12 may include stock images (e.g., facial feature templates 20). That is, facial feature templates 20 may include reference templates for a particular feature (e.g., removable facial feature templates 60 and non-removable facial feature templates 62, as shown in FIG. 2). As discussed herein, facial feature templates 20 may include templates calculated from images of people with and without the removable and non-removable facial features that may decrease a level of distinctiveness between two users. Each template of the facial feature templates 20 may include a normalized similarity score between the template and a face template for which it is known whether or not the removable and/or non-removable feature is present.

In some examples, facial feature module 14 may compare the authentication face template to the facial feature templates 20 and calculate a similarity score. For example, facial feature module 14 may use facial recognition methods (e.g., facial recognition algorithms) to calculate the similarity scores. Facial feature module 14 may then determine a weighted sum of the calculated similarity scores for each comparison between the authentication face template and the facial feature templates. Based on the weighted sum of the calculated similarity scores, facial feature module 14 may determine whether or not the authentication image includes the removable and/or non-removable facial features that may decrease a level of distinctiveness between two users.

While examples of the disclosure are primarily described with regard to detecting removable facial features such as sunglasses and non-removable facial features such as facial hair, examples are not limited as such. Rather, some examples may be employed to detect any facial feature that may decrease a level of distinctiveness between two users.

During the authentication phase, computing device 10 may compare the authentication template with user enrolled templates 22, and determine whether or not the images are sufficiently similar to each other for facial recognition purposes. If facial authentication module 16 of computing device 10 determines that the authentication face template is sufficiently similar to one or more of user enrolled templates 22, computing device 10 may grant user 30 access to functionalities and contents of computing device 10. If computing device 10 determines that the features of the authentication face template do not match those of one of the user enrolled templates 22 of facial recognition database 18, computing device 10 may deny user 30 access to the functionalities and contents of computing device 10.

In some examples, computing device 10 may utilize one or more facial recognition programs to compare metrics associated with the authentication face template to metrics associated with the user enrolled templates 22. Some examples of metrics may include distances between facial elements (pupil-to-pupil, mouth width, etc.), contours of various facial features, pixilation corresponding to skin tone or texture, hair and/or eye color, and many others. Facial recognition programs running on computing device 10 may perform the comparison using one or more well-known recognition algorithms, such as geometric and/or photometric approaches, three-dimensional (3D) modeling and recognition techniques, principal component analysis using eigen faces, linear discriminate analysis, elastic bunch graph matching, pattern matching, and dynamic link matching, to name just a few. Based on comparison-based values, such as preprogrammed acceptable margins of error, facial recognition programs running on computing device 10 may determine whether or not the authentication face template and at least one user enrolled template 22 are sufficiently similar to one another for facial recognition. In instances where the facial recognition programs grant a match, user 30 may successfully unlock computing device 10. Conversely, if the facial recognition programs deny a match, user 30 may be unable to unlock computing device 10, and computing device 10 may continue to operate in locked mode.

As discussed herein, similarity between the authentication face template and user enrolled templates 22 are quantified by using a similarity score, with higher similarity scores denoting greater degrees of similarity. If a similarity score between the authentication face template and one of user enrolled templates 22 is greater than a similarity score threshold, the two images are deemed a match and user 30 may be able to unlock computing device 10. On the other hand, if the similarity score between the authentication face image and user enrolled template 22 is less than the similarity score threshold, the two images are not deemed a match and computing device 10 may prevent user 30 from unlocking computing device 10.

Computing device 10 may implement techniques of the present disclosure to determine whether an authentication image includes at least one of a removable facial feature that may decrease a level of distinctiveness between two faces and a non-removable facial feature that may decrease a level of distinctiveness between two faces. Additionally, if computing device 10 determines that an authentication image includes a removable facial feature, computing device 10 may implement techniques of the present disclosure to output a notification to user 30 indicating for the user to remove the removable facial feature, and capture a second image for authentication. Moreover, if computing device 10 determines that an authentication image includes a non-removable facial feature, computing device 10 may implement techniques of the present disclosure to increase a similarity score threshold to an adjusted similarity score threshold.

FIG. 2 is a block diagram illustrating details of an example computing device for detecting facial features that may decrease a level of distinctiveness between two faces during facial recognition, in accordance with one or more aspects of the present disclosure. Computing device 10 may be one non-limiting example of computing device 10 of FIG. 1. Many other example embodiments of computing device 10 may be used in other instances.

As shown in the example of FIG. 2, computing device 10 includes one or more processors 50, memory 52, one or more storage devices 58, one or more input devices 24, one or more output devices 28, network interface 54, and camera 26. Components of computing device 10 may be interconnected (physically, communicatively, and/or operatively) for inter-component communications.

One or more processors 50 are, in some examples, configured to implement functionality and/or process instructions for execution within computing device 10. For example, processors 50 may process instructions stored in memory 52 and/or instructions stored on storage devices 58. Such instructions may include components of operating system 64, facial recognition module 12 including enrollment module 68, facial feature module 14, and facial authentication module 16, and one or more applications 66. Computing device 10 may also include one or more additional components not shown in FIG. 2, such as a power supply (e.g., a battery), a global positioning system (GPS) receiver, and a radio frequency identification (RFID) reader, among others.

Memory 52, in one example, is configured to store information within computing device 10 during operation. Memory 52, in some examples, is described as a computer-readable storage medium. In some examples, memory 52 is a temporary memory, meaning that a primary purpose of memory 52 may not be long-term storage. Memory 52, in some examples, is described as a volatile memory, meaning that memory 52 does not maintain stored contents when memory 52 is not receiving power. Examples of volatile memories include random access memories (RAM), dynamic random access memories (DRAM), static random access memories (SRAM), and other forms of volatile memories known in the art. In some examples, memory 52 is used to store program instructions for execution by processors 50. Memory 52, in one example, is used by software (e.g., operating system 64) or applications (e.g., one or more applications 66) executing on computing device 10 to temporarily store information during program execution.

One or more storage devices 58, in some examples, also include one or more computer-readable storage media. In some examples, storage devices 58 may be configured to store greater amounts of information than memory 52. Storage devices 58 may further be configured for long-term storage of information. In some examples, storage devices 58 include non-volatile storage elements. Examples of such non-volatile storage elements include magnetic hard discs, optical discs, solid state discs, floppy discs, flash memories, forms of electrically programmable memories (EPROM) or electrically erasable and programmable memories, and other forms of non-volatile memories known in the art.

As shown in FIG. 2, computing device 10 may also include one or more input devices 24. One or more of input devices 24 may be configured to receive input from a user through tactile, audio, video, or biometric channels. Examples of input devices 24 may include a keyboard, mouse, touchscreen, presence-sensitive display, microphone, one or more still and/or video cameras, fingerprint reader, retina scanner, or any other device capable of detecting an input from a user or other source, and relaying the input to computing device 10, or components thereof. Though shown separately in FIG. 2, camera 26 may, in some instances, be part of input devices 24.

Output devices 28 of computing device 10, in some examples, may be configured to provide output to a user through visual, auditory, or tactile channels. Output devices 28 may include a video graphics adapter card, a liquid crystal display (LCD) monitor, a light emitting diode (LED) monitor, a cathode ray tube (CRT) monitor, a sound card, a speaker, or any other device capable of generating output that may be intelligible to a user. Output devices 28 may also include a touchscreen, presence-sensitive display, or other input/output capable displays known in the art.

Computing device 10, in some examples, also includes network interface 54. Computing device 10, in one example, utilizes network interface 54 to communicate with external devices via one or more networks, such as one or more wireless networks. Network interface 54 may be a network interface card, such as an Ethernet card, an optical transceiver, a radio frequency transceiver, or any other type of device that can send and receive information. Other examples of such network interfaces may include Bluetooth, 3G, 4G, and WiFi radios in computing devices as well as USB. In some examples, computing device 10 utilizes network interface 54 to wirelessly communicate with external devices over a network.

Operating system 64 may control one or more functionalities of computing device 10 and/or components thereof. For example, operating system 64 may interact with applications 66, and may facilitate one or more interactions between applications 66 and one or more of processors 50, memory 52, storage devices 58, input devices 24, and output devices 28. As shown in FIG. 2, operating system 64 may interact with or be otherwise coupled to applications 66 and facial recognition module 12 and components thereof. In some examples, one or more of enrollment module 68, facial feature module 14, and facial authentication module 16 may be included in operating system 64. In these and other examples, one or more of enrollment module 68, facial feature module 14, and facial authentication module 16 may be part of applications 66. In other examples, one or more of enrollment module 68, facial feature module 14, and facial authentication module 16 may be implemented externally to computing device 10, such as at a network location. In some such instances, computing device 10 may use network interface 54 to access and implement functionalities provided by facial recognition module 12 and its components, through methods commonly known as "cloud computing."

Facial recognition module 12 may implement one or more techniques described in the present disclosure. For example, facial recognition module 12 may be configured to determine whether or not an authentication image captured by camera 26 includes at least one of a removable facial feature that may decrease a level of distinctiveness between two faces and a non-removable facial feature that may decrease a level of distinctiveness between two faces. Additionally, facial recognition module 12 may be configured to allow or deny access to computing device 10 by identifying an authorized user of computing device 10.

A user may interact with computing device 10 to cause computing device 10 to enter an enrollment mode, so that an authorized user may register facial features with computing device 10. During the enrollment process, input device 24 such as camera 26 may capture one or more enrollment images of the authorized user, including capturing one or more enrollment images of authorized user's face. Enrollment module 68 may calculate an enrolled face template from the enrollment images and store the templates as user enrolled templates 22 in facial recognition database 18. The enrolled face templates 22 may be a statistical representation of a facial appearance. For example, enrollment module 68 may extract various facial features such as, but not limited to, nose, eyes, mouth, nostrils, chins, forehead, eyebrows, cheekbones, and the like, including characteristics such as the position, size, and the relationship among those features. Facial features extracted by enrollment module 68 may also include facial characteristics, such as lines, curves, edges, points, areas, and the like. The facial features extracted from the one or more images of the authorized user's face may be stored as enrolled face templates 22 in computing device 10 that may be used during a facial recognition authentication process. As discussed herein, more than one user may be authorized to access a computing device. Thus, user enrolled templates 22 may include enrolled face templates 22 of one or more authorized users.

In some examples, storing the enrolled face templates 22 may include storing one or more values representing the facial features of each authorized user. Facial authentication module 16 may retrieve the facial features stored in user enrolled templates 22 so facial authentication module 16 may compare the facial features against facial features extracted from one or more templates calculated from images captured by camera 26 to determine whether a user attempting to access computing device 10 is an authorized user of computing device 10.

Facial recognition database 18 may further include facial feature templates 20. As discussed herein, facial feature templates 20 may include removable facial feature templates 60 and non-removable facial feature templates 62. Removable facial feature templates 60 may include one or more positive removable facial feature templates and one or more negative removable facial feature templates. The one or more positive removable facial feature templates are templates calculated from images of people having the removable facial feature that may decrease a level of distinctiveness between two faces. The one or more negative removable facial feature templates are templates calculated from images of people not having the removable facial feature that may decrease a level of distinctiveness between two faces. In one example, the removable facial feature is sunglasses. Thus, the one or more positive removable facial feature templates are templates calculated from images of people wearing sunglasses and the one or more negative removable facial feature templates are templates calculated from images of people not wearing sunglasses.

Non-removable facial feature templates 62 may include one or more positive non-removable facial feature templates and one or more negative non-removable facial feature templates. The one or more positive non-removable facial feature templates are templates calculated from images of people having the non-removable facial feature that may decrease a level of distinctiveness between two faces. The one or more negative non-removable facial feature templates are templates calculated from images of people not having the non-removable facial feature that may decrease a level of distinctiveness between two faces. In one example, the non-removable facial feature is facial hair. Thus, the one or more positive removable facial feature templates are templates calculated from images of people having facial hair and the one or more negative non-removable facial feature templates are templates calculated from images of people not having facial hair.

In some examples, the facial feature templates 20 may be a group of weighted weak classifiers, each of which consists of a normalized similarity score between the face that the facial feature template was created from and a face image for which it is known whether or not the removable facial feature and/or non-removable facial feature is present. In one example, facial feature module 14 may assign a weight to each template of the facial feature templates 20 and may determine whether or not the face template from the authentication image includes the removable facial feature and/or non-removable facial feature based at least in part on a weighted sum of similarity scores between the face template and the facial feature templates 20. In one example, facial feature module 14 may use a learning technique known as AdaBoost (adaptive boosting) to iteratively select face templates from removable facial feature templates 60 and non-removable facial feature templates 62 as weak classifiers and to weight them appropriately. Facial feature module 14 may adaptively influence the selection of training examples (e.g., facial feature templates 20) in a way that improves the overall classifier. Specifically, the training examples (e.g., facial feature templates 20) are weighted for each classifier (e.g., having and not having the removable facial feature and having and not having the non-removable facial feature) so that the facial feature templates 20 that are erroneously classified by a given classifier are more likely to be selected for further training than facial feature templates that were correctly classified.

As an example, the following applies AdaBoost for detecting a removable facial feature (e.g., sunglasses) that may decrease distinctiveness between two faces. In this example, $$X_{training} = \{x_i\}, i \in \{1 \ldots N\}$$

denotes a training set of N face templates, labeled for the presence of sunglasses on the face, and $$X_{cross\text{-}validation}$$

denotes a subject-disjoint cross validation set of M similarity labeled face templates. Also, $\omega_1$ and $\omega_2$ denote the category labels, such that $\omega_1$=sunglasses and $\omega_2$=no sunglasses. Finally, $h_i(x)$ defines a "weak classifier", where:

$$h_i(x) = g(p_i \times similarity(x_i, x))$$

Where $p_i$ denotes the polarity of template $x_i$, such that:

$$p_i = \begin{cases} +1 & \text{if } x \subset \omega_1 \\ -1 & \text{if } x \subset \omega_2 \end{cases}$$

Similarity $(x_i, x)$ denotes the match score for face template $x_i$ and face instance x given our face recognizer, and $g(\bullet)$ denotes a normalization function computed over $X_{training}$, such that:

$$h_i(x) \in [-1, +1]$$

Applying AdaBoost iteratively selects and weighs classifiers $h_i(x)$ to minimize classification error over $X_{training}$. The process is repeated until the classification error over $X_{cross\text{-}validation}$ no longer decreases. The sunglasses classifier $H(x)$ for a given face instance x over $\omega_1$ and $\omega_2$ is then given by:

$$H(x) = \sum_k w_k \times h_x(x)$$

Where $w_k$ denotes the weight for classifier $h_k(x)$ assigned by the AdaBoost algorithm during training Now, $H(x) > 0$ indicates the presence of sunglasses, while, $H(x) < 0$ indicates the absence of sunglasses.

As discussed herein, computing device 10 may be in a locked state and a user may wish to gain access to computing device 10. In some examples, authentication may be granted using facial recognition (e.g., facial recognition module 12). Camera 26 may capture an authentication image including at least a face of a user for a facial recognition process to unlock computing device 10. Facial feature module 14 may receive the authentication image and calculate an authentication face template for the face in the authentication image. Facial feature module 14 may analyze the authentication face template to determine whether or not an authentication image captured by camera 26 includes at least one of a removable facial feature that may decrease a level of distinctiveness between two faces and a non-removable facial feature that may decrease a level of distinctiveness between two faces.

For example, facial feature module 14 may compare the authentication face template to removable facial feature templates 60. Facial feature module 14 may determine a plurality of removable facial feature similarity scores between the authentication face template and one or more removable facial feature templates 60. That is, a removable facial feature similarity score may be determined for each comparison between the authentication face template and the one or more positive removable facial feature templates and the one or more negative removable facial feature templates. Facial feature module 14 may calculate a weighted sum of the plurality of removable facial feature similarity scores. As discussed herein, if the weighted sum of the plurality of removable facial feature similarity scores is positive, facial feature module 14 may determine that the authentication image does include the removable facial feature. Additionally, if the weighed sum of the plurality of removable facial feature similarity scores is negative, facial feature module 14 may determine that the authentication image does not include the removable facial feature.

Facial feature module 14 may send a message to facial authentication module 16 indicating that the authentication face template of the authentication image includes a removable facial feature (e.g., sunglasses). Responsive to the message, facial authentication module 16 may cause output device 28 to output a notification for the user to remove the removable facial feature. The user may remove the removable facial feature and camera 26 may capture a second authentication image for facial recognition. Facial feature module 14 may calculate another authentication face template and determine whether the authentication image includes the removable facial feature. Facial feature module 14 may send a message to facial authentication module 16 indicating that the authentication face template does not include the removable facial feature.

Facial authentication module 16 may calculate a similarity score between the authentication face template (e.g., not having the removable facial feature) and the enrolled face template, and determine whether the first template is above the similarity score threshold. When the similarity score is greater than the similarity score threshold, facial authentication module 16 may grant authentication to computing device 10 by facial recognition and transition computing device 10 from a locked state to an unlocked state. When the similarity score is less than the similarity score threshold, facial authentication module 16 may deny authentication to computing device 10 by facial recognition and prevent computing device 10 from transitioning from a locked state to an unlocked state.

Additionally, facial feature module 14 may compare the authentication face template to non-removable facial feature templates 62. Facial feature module 14 may determine a plurality of non-removable facial feature similarity scores between the authentication face template and non-removable facial feature templates 62. That is, facial feature module 14 may determine a non-removable facial feature similarity score for each comparison between the authentication face template and the one or more positive non-removable facial feature templates and the one or more negative non-removable facial feature templates. Facial feature module 14 may calculate a weighted sum of the plurality of non-removable facial feature similarity scores. As discussed herein, if the weighted sum of the plurality of non-removable facial feature similarity scores is positive, facial feature module 14 may determine that the authentication image does include the non-removable facial feature. Additionally, if the weighed sum of the plurality of non-removable facial feature similarity scores is negative, facial feature module 14 may determine that the authentication image does not include the non-removable facial feature.

Facial feature module 14 may send a message to facial authentication module 16 indicating that the face template of the authentication image includes a non-removable facial feature (e.g., facial hair). Responsive to the message, facial authentication module 16 may increase the similarity score threshold to an adjusted similarity score threshold. Facial recognition module 16 may calculate a similarity score between the face template of the user in the authentication image and one or more enrolled templates of authorized users (e.g., the user). Facial authentication module 16 may determine whether the similarity score is greater than the adjusted similarity score threshold. When the similarity score is greater than the adjusted similarity score, facial authentication module 16 may grant authentication to computing device 10 by facial recognition and transition computing device 10 from a locked state to an unlocked state. When the similarity score is less than the adjusted similarity score, facial authentication module 16 may deny authentication to computing device 10 by facial recognition and prevent computing device 10 from transitioning from a locked state to an unlocked state.

In some examples, facial feature module 14 may determine whether or not the authentication face template includes a removable facial feature and/or non-removable facial feature before facial authentication module 16 begins to determine whether or not the authentication image matches one of the user enrolled templates. For example, facial authentication module 16 may compare the authentication face template with user enrolled templates 22 when facial authentication module 16 receives a message from facial feature module 14 indicating that the authentication face template does not include a removable facial feature or a non-removable facial feature that may decrease the distinctiveness between two faces. For example, if a removable and/or non-removable facial feature that may decrease the distinctiveness between two faces is detected, facial feature module 14 may prevent facial authentication module 16 from analyzing the authentication face template to determine whether or not the user is an authenticated user. In some examples, preventing the facial authentication module 16 from performing facial recognition techniques may save power and extend battery life.

In other examples, facial feature module 14 may analyze the authentication template for the removable facial feature and the non-removable facial feature and facial authentication module 16 may compare the authentication face template to user enrolled templates 22 at substantially the same time. If facial feature module 14 determines the authentication face template includes the removable facial feature and/or the non-removable facial feature, facial feature module 14 may send a message to facial authentication module 16 indicating that the facial authentication module should stop the comparison.

In other examples, facial authentication module 16 may determine that the authentication template is a match to one or more user enrolled templates prior to the facial feature module 16 determining whether or not the authentication template includes the removable facial feature and/or the non-removable facial feature. If facial authentication module 16 determines that the authentication template is a match to one or more enrolled user templates prior to facial feature module 14 determining whether or not the authentication template includes the removable facial feature and/or the non-removable facial feature, facial authentication module 16 may wait to transition computing device 10 from a locked state to the unlocked state until after receiving a message from facial feature module 14 indicating that the authentication face template does not include the removable facial feature or the non-removable facial feature. When facial authentication module 14 receives the message indicating that the authentication face template does not include the removable facial feature or the non-removable facial feature, facial authentication module 14 may grant access to computing device 10.

In another example, facial feature module 14 may send a message indicating that the authentication face template includes the removable facial feature and/or the non-removable facial feature after facial authentication module 16 determines that the authentication face template is a match to the enrolled user template. In that instance, even though the authentication face template was a match, facial authentication module 16 may deny access to computing device 10 or perform facial recognition again with the adjusted similarity score threshold. For example, if facial feature module 14 detected a removable facial feature after facial authentication module 16 has determined the authentication template matches one or more user enrolled templates, facial authentication module 16 may deny access and output a notification for the user to remove the removable facial feature. In some examples, the notification may indicate to the user to capture another authentication image to continue with the facial recognition. If facial feature module 14 detects a non-removable facial feature after facial authentication module 16 has determined the authentication template matches one or more user enrolled templates, facial authentication module 16 may increase the security (e.g., by increasing the similarity score threshold to an adjusted similarity score threshold) and perform the facial recognition again (e.g., determine whether or not the authentication face template matches the user enrolled image) based on the increased security. That is, facial authentication module 16 may determine if the similarity score is greater than the adjusted similarity score threshold.

Figure 3:
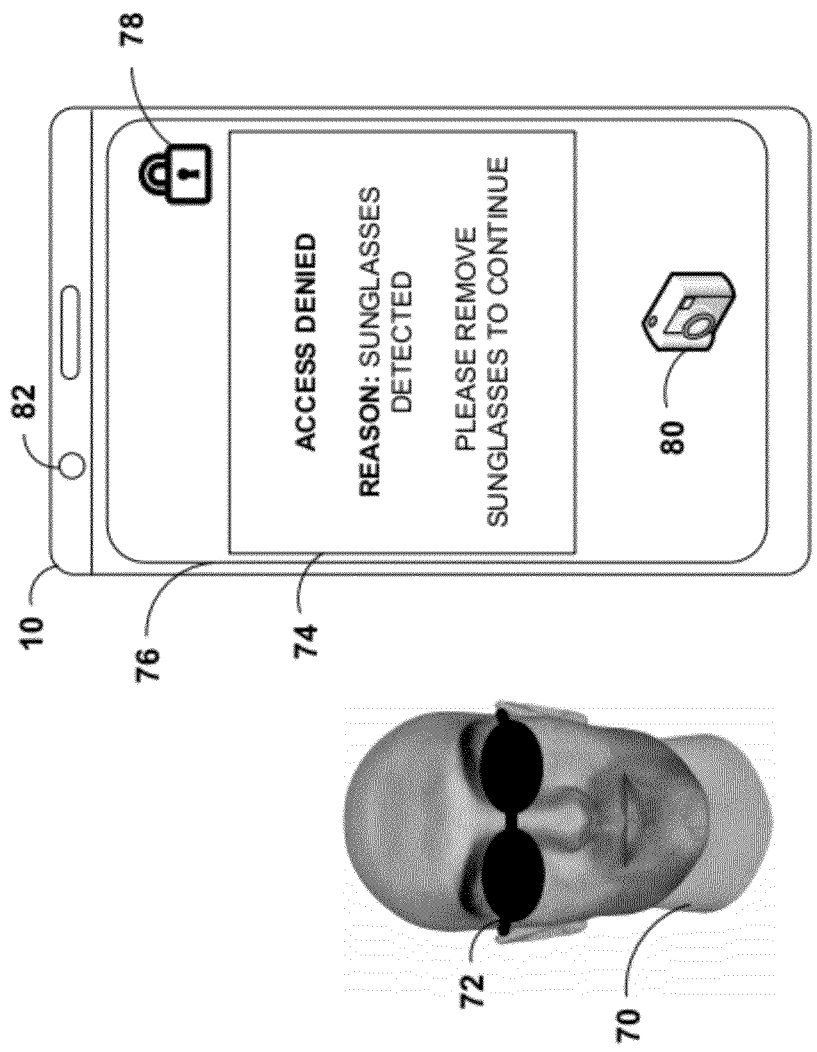
FIG. 3 is a conceptual diagram illustrating an example computing device that detects removable facial features that may decrease a level of distinctiveness between two faces during facial recognition, in accordance with one or more aspects of the present disclosure.

FIG. 3 is a conceptual diagram that illustrates the behavior of computing device 10 after user 70 attempts to unlock computing device 10 by use of facial recognition technology. User 70 may authenticate with computing device 10 using facial recognition. GUI 76 may display graphical information related to authenticating a user to computing device 10 using facial recognition according to the techniques of this disclosure. GUI 76 may include one or more GUI elements, such as lock indicator 78 and capture icon 80. Computing device 10 may be configured to operate in a "locked" mode, shown by lock indicator 78.

In the specific example of FIG. 3, user 70 may have captured an authentication image (e.g., an image used for facial recognition to transition computing device 10 from a locked state to an unlocked state) by an input device such as camera 82. User 70 is unable to authenticate by facial recognition because user 70 is wearing sunglasses (e.g., a removable facial feature that may decrease a level of distinctiveness between two faces).

In this example, user 70 may be assumed to be an authorized user (i.e., at least one user enrollment template stored by computing device 10 was calculated from an image including the face of user 70). After computing device 10 detects that user 70 includes a removable facial feature that may decrease a level of distinctiveness between two faces (e.g., sunglasses) computing device 10 may output a notification 74. Notification 74 may indicate that user 70 failed to gain access to computing device 10. In this example, notification 74 may indicate that the reason that computing device 10 failed to authenticate user 70 is because sunglasses were detected. In additional examples, notification 74 may include an action, for example, instructing the user to remove sunglasses to continue the facial recognition process. In one example, user 70 may remove the removable facial feature and continue by selecting capture icon 80 to capture another authentication image for facial recognition.

As discussed herein, certain removable facial features (e.g., sunglasses) may decrease the distinctiveness between two faces and may cause an otherwise unauthorized user to gain access to computing device 10 when the unauthorized user has the removable facial feature. Computing device 10 may detect when a user attempting to gain access to computing device 10 includes the removable facial feature and may output a notification indicating that the authentication process failed because sunglasses have been detected. The notification may instruct the user to remove the sunglasses to continue. In one example, computing device 10 may begin by capturing an authentication image from a user attempting to gain access to computing device 10. As discussed herein, computing device 10 may utilize the one or more facial recognition programs running on computing device 10 to match an authentication face template calculated from the authentication image to one or more user enrolled templates. To reduce the occurrence of errors by the facial recognition programs, computing device 10 may first analyze the authentication template for one or more removable facial features that may contribute to such errors. For example, computing device 10 may analyze the authentication template for one or more removable facial features that may decrease the distinctiveness between two faces.

Figure 4:
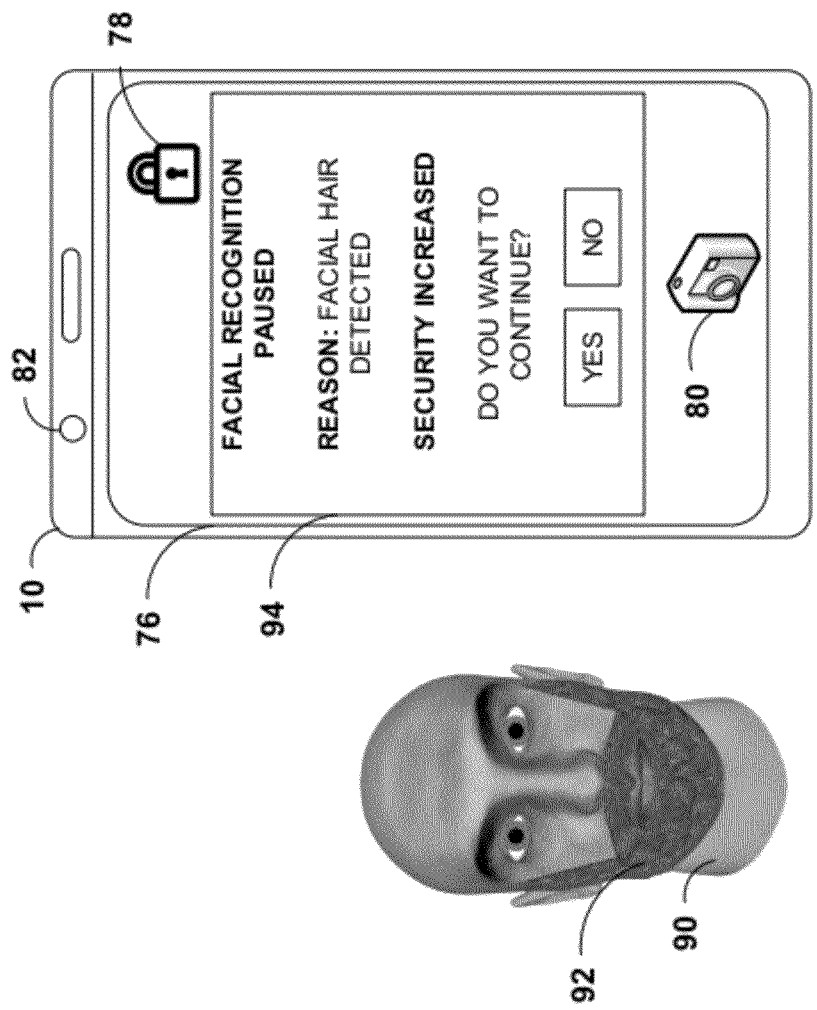
FIG. 4 is a conceptual diagram illustrating an example computing device that detects non-removable facial features that may decrease a level of distinctiveness between two faces during facial recognition, in accordance with one or more aspects of the present disclosure.

FIG. 4 is a conceptual diagram that illustrates the behavior of computing device 10 after user 90 attempts to unlock computing device 10 by use of facial recognition technology. User 70 may authenticate with computing device 10 using facial recognition. GUI 76 may display graphical information related to authenticating a user to computing device 10 using facial recognition according to the techniques of this disclosure. GUI 76 may include one or more GUI elements, such as lock indicator 78 and capture icon 80. Computing device 10 may be configured to operate in a "locked" mode, shown by lock indicator 78.

In the specific example of FIG. 4, user 90 may have captured an authentication image by an input device such as camera 82. As illustrated in FIG. 4, facial feature module 14 detected a non-removable facial feature that may decrease the distinctiveness between two faces (e.g., facial hair) and sent a message to facial authentication module 16 to pause the facial recognition process.

In this example, user 90 may be an authorized user (i.e., at least one user enrollment template stored by computing device 10 was calculated from an image including the face of user 90). After computing device 10 detects that user 90 includes a non-removable facial feature that may decrease a level of distinctiveness between two faces (e.g., facial hair) computing device 10 may output a notification 94. Notification 94 may indicate that the facial recognition process has been paused because facial hair has been detected. Notification 94 may further indicate that the security has been increased. As discussed herein, facial authentication module 16 may confirm authentication of a user when a similarity score between the template calculated from the authentication image and one or more of the enrolled user templates is above a similarity score threshold. Upon detecting facial hair, computing device 10 may increase the similarity score to an adjusted similarity score threshold. Additionally, notification 94 may provide options (e.g., "YES" and "NO") for whether user 90 wants to continue with the facial recognition with the increased security.

In some examples, facial feature module 14 may not cause computing device 10 to output notification 94 to user 90 when the non-removable facial feature is detected. In that instance, computing device 10 may automatically increase the security. Access to computing device 10 depends on whether or not the similarity score between the authentication template and the one or more user enrolled templates is greater than the adjusted similarity score threshold.

As discussed herein, certain non-removable facial features (e.g., facial hair) may decrease the distinctiveness between two faces and may cause an otherwise unauthorized user to gain access to computing device 10 when the unauthorized user has the non-removable facial feature. Computing device 10 may detect when a user attempting to gain access to computing device 10 includes the non-removable facial feature and may increase the similarity score threshold to an adjusted similarity score. Facial feature module 14 may or may not cause computing device 10 to output a notification to the user indicating that the security has been increased. As discussed herein, computing device 10 may utilize the one or more facial recognition programs running on computing device 10 to match an authentication template calculated from the authentication image to one or more stored user enrolled templates. To reduce the occurrence of errors by the facial recognition programs, computing device 10 may first analyze the authentication template for one or more non-removable facial features that may contribute to such errors. For example, computing device 10 may analyze the authentication template for one or more non-removable facial features that may decrease the distinctiveness between two faces.

Figure 5:
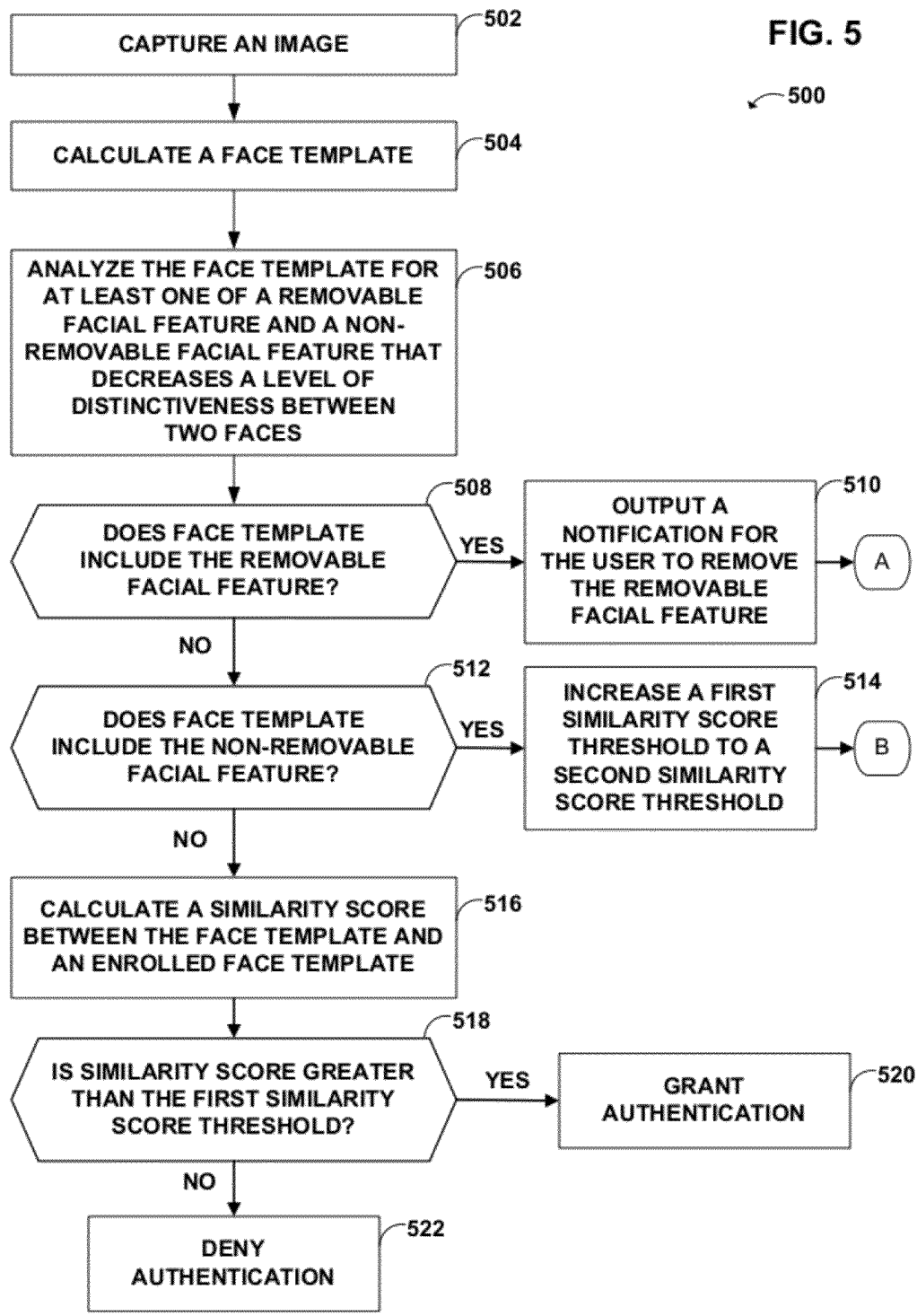
FIG. 5 is a flowchart illustrating an example process that may be performed by a computing device to analyze a face image and detect facial features that may decrease a level of distinctiveness between two faces during facial recognition, in accordance with one or more aspects of the present disclosure.

FIG. 5 is a flowchart illustrating an example process that may be performed by a computing device to determine whether an image for facial recognition includes a removable facial feature and/or a non-removable facial feature that may decrease a level of distinctiveness between two faces. Process 500 may be performed by any computing device described in this disclosure. For purposes of ease of illustration only, process 500 is described herein with respect to computing device 10 of FIG. 1, in the context of analysis methods described with respect to FIGS. 2-4.

Process 500 may begin when computing device 10 captures an image (502). In many instances, computing device 10 may use an image capture device, such as a camera 26. Computing device 10 may calculate a face template from the image (504). Though the captured image and face template may serve several purposes, for ease of illustration purposes only, process 500 will be described with respect to an authentication image and an authentication face template. In one example, facial feature module 14 and/or facial authentication module 16 may calculate the authentication face template from the authentication face image.

Computing device 10 may analyze the face template for at least one of a removable facial feature and a non-removable facial feature that may decrease a level of distinctiveness between two faces (506). As discussed herein, computing device 10 may store a plurality of facial feature templates 20. Facial feature module 14 may compare the face template with the plurality of facial feature templates 20 stored in facial recognition database 18 to determine whether or not the face template includes a removable and/or non-removable facial feature that may decrease a level of distinctiveness between two users.

Facial feature templates 20 may include a group of removable facial feature templates 60 and a group of non-removable facial feature templates 62. The group of removable facial feature templates 60 may include one or more positive removable facial feature templates and one or more negative removable facial feature templates, where the positive removable facial feature templates are templates calculated from images of people having the removable facial feature and the negative removable facial feature templates are templates calculated from images of people not having the removable facial feature. Additionally, the group of non-removable facial feature templates 62 may include one or more positive removable facial feature templates and one or more negative removable facial feature templates, where the positive removable facial feature templates are templates calculated from images of people having the non-removable facial feature and the negative removable facial feature templates are templates calculated from images of people not having the non-removable facial feature.

Process 500 may determine whether the face template includes a removable facial feature that may decrease the distinctiveness between two faces (508). In one example, feature module 14 may determine whether the face template includes the removable facial feature (508). For example, facial feature module 14 may compare the face template to the group of removable facial feature templates 60, as discussed herein. Facial feature module 14 may determine a plurality of removable facial feature similarity scores between the face template and at least one of the one or more positive removable facial feature templates and at least one of the negative removable facial feature templates. Facial feature module 14 may calculate a weighed sum of the plurality of removable facial feature similarity scores. In some examples, when the weighed sum of the plurality of removable facial feature similarity scores is positive, the face template includes the removable facial feature, and when the weighed sum of the plurality of removable facial feature similarity scores is negative, the face template does not include the removable facial feature.

If the face template includes the removable facial feature ("Yes" branch of 508), process 500 may output a notification for the user to remove the removable facial feature (510). For example, facial feature module 14 may send a message to facial authentication module 16 indicating that the removable facial feature was detected in the face template. Responsive to the message, facial authentication module 16 may cause computing device 10 to output a notification for the user to remove the removable facial feature. A user may capture another image for the facial recognition process. For example, once facial authentication module 16 outputs the notification for the user to remove the removable facial feature, process 500 may include start over by capturing an image (502).

If the face template does not include the removable facial feature ("No" branch of 508), process 500 may determine whether the face template includes the non-removable facial feature (512). For example, facial feature module 14 may compare the face template to the group of non-removable facial feature templates 62, as discussed herein. Facial feature module 14 may determine a plurality of non-removable facial feature similarity scores between the face template and at least one of the one or more positive non-removable facial feature templates and at least one of the one or more negative non-removable facial feature templates. Facial feature module 14 may calculate a weighed sum of the plurality of removable facial feature similarity scores. In some examples, when the weighed sum of the plurality of non-removable facial feature similarity scores is positive, the face template includes the non-removable facial feature, and when the weighed sum of the plurality of non-removable facial feature similarity scores is negative, the face template does not include the non-removable facial feature.

If the face template includes the non-removable facial feature ("Yes" branch of 512), process 500 may adjust a first similarity score threshold to a second similarity score threshold (514). For example, facial feature module 14 may send a message to facial authentication module 16 indicating that the non-removable facial feature 16 was detected in the face template. Responsive to the message, facial authentication module 16 may increase the similarity score threshold to an adjusted similarity score threshold.

If the face template does not include the non-removable facial feature ("No" branch of 512), process 500 may calculate a similarity score between the face template and one or more enrolled face templates (512). For example, facial feature module 14 may send a message to facial authentication module 16 indicating that the face template does not include the removable facial feature or the non-removable facial feature that may decrease the distinctiveness between two faces.

Responsive to the message, facial authentication module 16 may continue with the facial recognition process and calculate a similarity score between the face template and the one or more enrolled face templates. As discussed herein, the enrolled template(s) of the user is a calculated template of a previously captured image(s) of the user. Process 500 may determine whether the similarity score is greater than the first similarity score threshold (518). If the similarity score is greater than the first similarity score threshold ("Yes" branch of 518), process 500 may grant authentication (520). For example, facial authentication module 16 may determine that the similarity score is greater than the first similarity score threshold and authenticate the user attempting to gain access to computing device 10. For example, granting authentication may include transitioning computing device 10 from a locked state to an unlocked state.

If the similarity score is less than the first similarity score threshold ("No" branch of 518), process 500 may deny authentication (522). For example, facial authentication module 16 may determine that the similarity score is less than the first similarity score threshold and not authenticate the user attempting to gain access to computing device 10. For example, denying authentication may include preventing computing device 10 from transitioning from the locked state to an unlocked state.

In some examples, facial recognition module 12 analyzes the face template to determine whether the face image includes at least one of a removable facial feature and a non-removable facial feature that may decrease a level of distinctiveness between two faces. Additionally, facial recognition module 12 calculates the similarity score between the face template of the first image and the enrolled template of authorized users. As discussed herein, analyzing the first face template for facial features that may decrease a level of distinctiveness and analyzing the first face template for facial recognition authentication may be performed using the same facial recognition algorithm. For example, the facial recognition algorithm is trained, as discussed herein, to detect specific facial features that may decrease a level of distinctiveness between users. In some examples, the removable facial feature that may decrease a level of distinctiveness between two faces is sunglasses and the non-removable facial feature that may decrease a level of distinctiveness between two faces is facial hair, as discussed herein.

Figure 6:
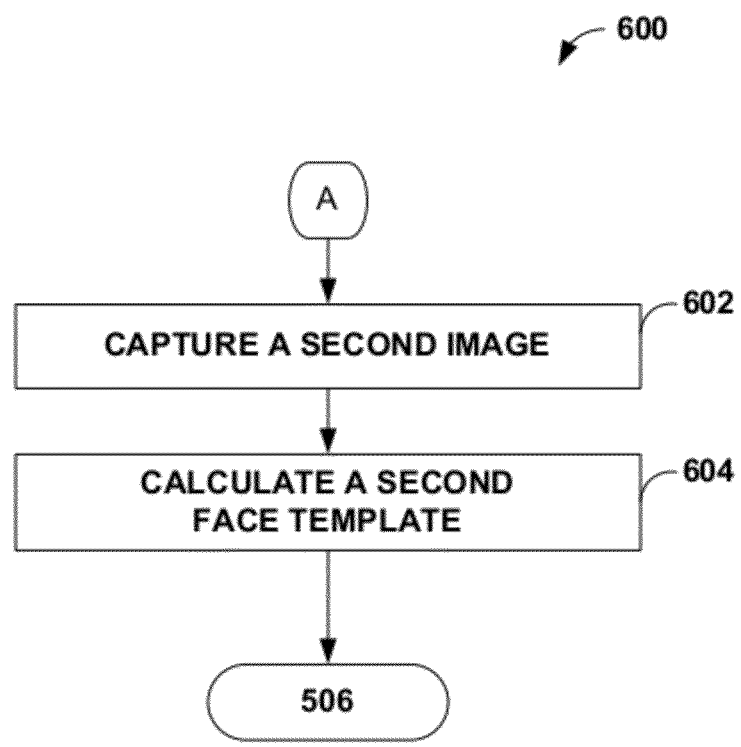
FIG. 6 is a flowchart illustrating an example process that may be performed by a computing device when a removable facial feature that may decrease a level of distinctiveness between two faces has been detected in the image for facial recognition, in accordance with one or more aspects of the present disclosure.

FIG. 6 is a flowchart illustrating an example process that may be performed by a computing device when a removable facial feature that may decrease a level of distinctiveness between two faces has been detected in the image for facial recognition. Process 600 may be performed by any computing device described in this disclosure. For purposes of ease of illustration only, process 600 is described herein with respect to computing device 10 of FIG. 1, in the context of analysis methods described with respect to FIGS. 2-4.

Process 600 may begin when computing device 10 detects that the face template includes the removable facial feature and outputs a notification for the user to remove the removable facial feature (e.g., step 510 in process 500 illustrated in FIG. 5). In some examples, process 600 may begin by capturing another image (e.g., a second image) for facial recognition (602). In many instances, computing device 10 may use an image capture device, such as camera 26. Computing device 10 may calculate another face template (e.g., second face template) from the second image (604). Though the second image and second face template may serve several purposes, for ease of illustration purposes only, process 600 will be described with respect to a second authentication image and a second authentication face template. In one example, facial feature module 14 and/or facial authentication module 16 may calculate the second authentication face template from the second authentication face image.

Process 600 may further calculate a similarity score between the second face template and the enrolled face template (606). For example, facial feature module 14 may send a message to facial authentication module 16 indicating that the face template does not include the removable facial feature or the non-removable facial feature that may decrease the distinctiveness between two faces. Process 600 may include analyzing the second face template for at least one of a removable facial feature and a non-removable facial feature that decreases a level of distinctiveness between two faces (e.g., step (506) of process 500).

Figure 7:
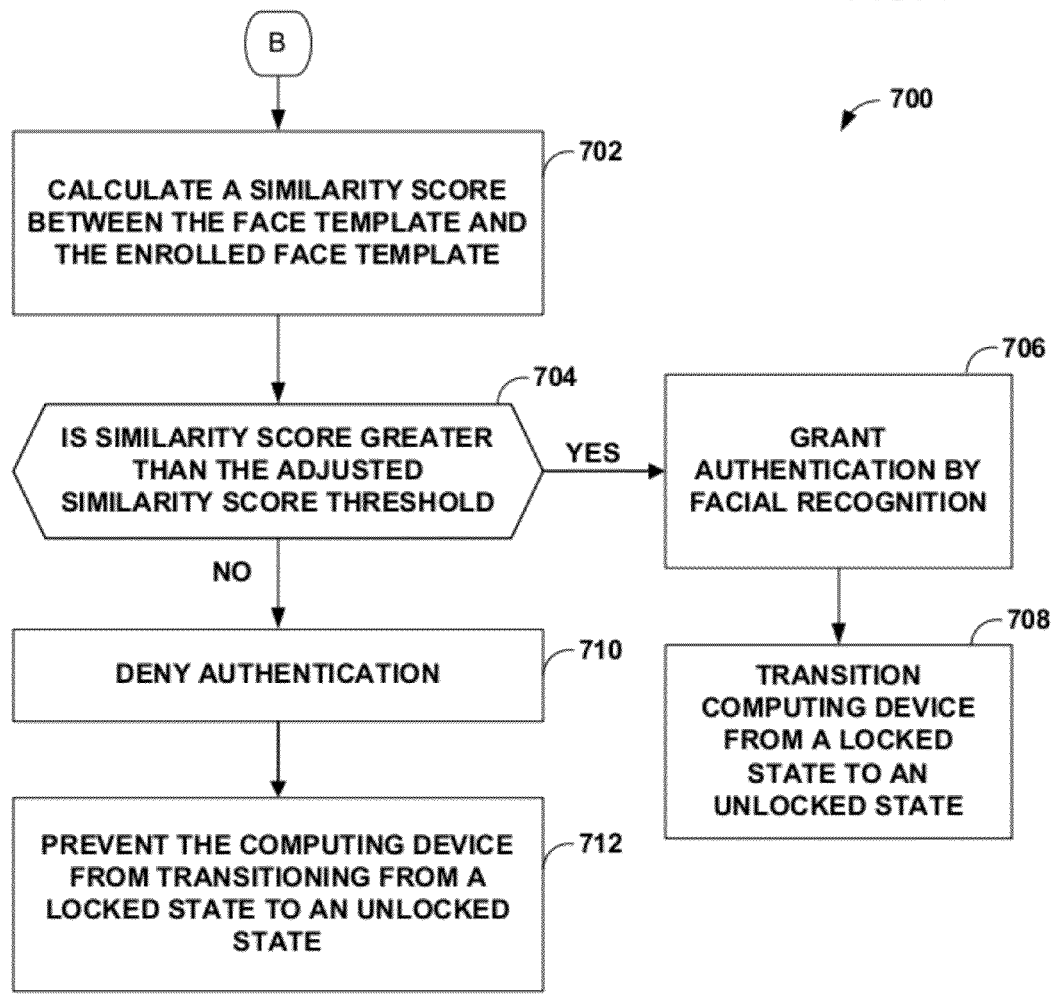
FIG. 7 is a flowchart illustrating an example process that may be performed by a computing device when a non-removable facial feature that may decrease a level of distinctiveness between two faces has been detected in the image for facial recognition, in accordance with one or more aspects of the present disclosure.

FIG. 7 is a flowchart illustrating an example process that may be performed by a computing device when a non-removable facial feature that may decrease a level of distinctiveness between two faces has been detected in the image for facial recognition. Process 700 may be performed by any computing device described in this disclosure. For purposes of ease of illustration only, process 700 is described herein with respect to computing device 10 of FIG. 1, in the context of analysis methods described with respect to FIGS. 2-4.

Process 700 may begin when computing device 10 detects that the face template includes the non-removable facial feature and adjusts a first similarity score threshold to a second similarity score threshold (e.g., step 514 in process 500 illustrated in FIG. 5). For example, facial feature module 14 may send a message to facial authentication module 16 indicating that the non-removable facial feature 16 was detected in the face template. Responsive to the message, facial authentication module 16 may adjust the first similarity score threshold to a second similarity score threshold, wherein the second similarity score threshold is greater than the first similarity score threshold.

In some examples, process 700 may calculate a similarity score between the face template and the enrolled face template (702). Process 700 may determine whether the similarity score is greater than the second similarity score threshold (704). If the similarity score is greater than the second similarity score threshold ("Yes" branch of 704), process 700 may include granting authentication by facial recognition (706). For example, facial authentication module 16 may determine that the similarity score is greater than the second similarity score threshold and authenticate the user attempting to gain access to computing device 10. Upon granting authentication by facial recognition, process 700 may transition computing device 10 from a locked state to an unlocked state (708).

If the similarity score is less than the second similarity score threshold ("No" branch of 708), process 700 may deny authentication (710). Facial authentication module 16 may determine that the similarity score is less than the adjusted similarity score threshold and not authenticate the user attempting to gain access to computing device 10. Process 700 may prevent computing device 10 from transitioning from the locked state to an unlocked state (712).

In some examples, process 700 may determine whether an authentication session is complete. For example, determining an authentication session is complete may include determining whether authentication by facial recognition was as least one of denied and granted. In one example, facial authentication module 16 may determine whether or not the authentication session has ended based on whether or not access was granted by facial recognition for the authentication template. Process 700 may further include, responsive to determining the authentication session is complete, adjust the second similarity score threshold back to the first similarity score threshold. For example, facial authentication module 16 may decrease the second similarity score threshold back to the similarity score threshold once the authentication session is complete.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method, comprising:
   capturing, by a computing device, an image including at least a face of a user;
   calculating, by the computing device, a face template of the face of the user in the image;
   analyzing, by the computing device, the face template to determine whether the face includes at least one of a removable facial feature that decreases a level of distinctiveness between two faces and a non-removable facial feature that decreases a level of distinctiveness between two faces,
   wherein analyzing the face template to determine whether the face includes the removable facial feature that decreases the level of distinctiveness between two faces further comprises:
      determining, by the computing device, a plurality of removable facial feature similarity scores between the face template and one or more removable facial feature templates; and
      calculating, by the computing device, a weighted sum of the plurality of removable facial feature similarity scores,
      wherein when the weighted sum of the plurality of removable facial feature similarity scores is positive, determining that the face includes the removable facial feature, and
      wherein when the weighted sum of the plurality of removable facial feature similarity scores is negative, determining that the face does not include the removable facial feature,
   when the face includes the removable facial feature, the method comprises:
      outputting, by the computing device, a notification for the user to remove the removable facial feature; and
   when the face includes the non-removable facial feature, the method comprises:
      adjusting, by the computing device, a first similarity score threshold to a second similarity score threshold.

2. The method of claim 1, further including:
   storing a group of removable facial feature templates, wherein the group of removable facial feature templates includes one or more positive removable facial feature templates and one or more negative removable facial feature templates, wherein the positive removable facial feature templates are images of people having the removable facial feature, and wherein the negative removable facial feature templates are images of people not having the removable facial feature.

3. The method of claim 2, wherein analyzing the face template to determine whether the face includes the removable facial feature that decreases the level of distinctiveness between two faces further comprises:
comparing, by the computing device, the face template to the group of removable facial feature templates,
wherein determining the plurality of removable facial feature similarity scores comprises determining, by the computing device, the plurality of removable facial feature similarity scores between the face template and one or more of the positive removable facial feature templates and one or more of the negative removable facial feature templates.

4. The method of claim 1, wherein the image is a first image and the face template is a first face template, and wherein when the face includes the removable facial feature, the method further comprises:
capturing, by the computing device, a second image including the face of the user;
calculating, by the computing device, a second face template of the face of the user in the second image;
calculating a similarity score between the second face template of the user in the second image and an enrolled template of the user; and
determining, by the computing device, whether the similarity score is above the first similarity score threshold.

5. The method of claim 4, wherein the enrolled template of the user is calculated from a previously captured image of the user.

6. The method of claim 4, upon determining that the similarity score is greater than the first similarity score threshold, granting authentication by facial recognition.

7. The method of claim 4, upon determining that the similarity score is less than the first similarity score threshold, denying authentication by facial recognition.

8. The method of claim 1, further including:
storing a group of non-removable facial feature templates, wherein the group of non-removable facial feature templates includes one or more positive non-removable facial feature templates and one or more negative non-removable facial feature templates, and wherein the positive non-removable facial feature templates are images of people having the non-removable facial feature, and wherein the negative removable facial feature templates are images of people not having the non-removable facial feature.

9. The method of claim 8,
wherein analyzing the face template to determine whether the face includes the non-removable facial feature that decreases the level of distinctiveness between two faces further comprises:
comparing, by the computing device, the face template to the group of non-removable facial feature templates;
determining, by the computing device, a plurality of non-removable facial feature similarity scores between the face template and one or more of the positive non-removable facial feature templates and each one or more of the negative non-removable facial feature templates; and
calculating, by the computing device, a weighted sum of the plurality of non-removable facial feature similarity scores,
wherein when the weighted sum of the plurality of non-removable facial feature similarity scores is positive, determining that the face includes the non-removable facial feature, and
wherein when the weighted sum of the plurality of non-removable facial feature similarity scores is negative, determining that the face does not include the non-removable facial feature.

10. The method of claim 1, wherein when the face includes the non-removable facial feature, the method further comprises:
calculating a similarity score between the face template of the user in the image and an enrolled template of the user; and
determining, by the computing device, whether the similarity score is above the second similarity score threshold.

11. The method of claim 10, wherein when the similarity score is above the second similarity score threshold, the method further comprises:
granting authentication by facial recognition; and
transitioning the computing device from a locked state to an unlocked state, and
wherein when the similarity score is below the second similarity score threshold, the method further comprises:
denying authentication by facial recognition; and
preventing the computing device from transitioning from a locked state to an unlocked state.

12. The method of claim 10, further comprises:
determining, by the computing device, when an authentication session is complete; and
responsive to determining the authentication session is complete, adjusting the second similarity score threshold back to the first similarity score threshold.

13. The method of claim 12, wherein determining when the authentication session is complete further comprises:
determining, by the computing device, whether authentication by facial recognition was at least one of denied and granted.

14. The method of claim 1, wherein when the first face template does not include the removable facial feature and the non-removable facial feature, the method further comprises:
calculating, by the computing device, a similarity score between the face template of the user in the image and an enrolled template of the user; and
determining, by the computing device, whether the similarity score is above the first similarity score threshold,
when the similarity score is above the first similarity score threshold, the method further comprises:
granting authentication by facial recognition; and
transitioning the computing device from a locked state to an unlocked state; and
when the similarity score is below the first similarity score threshold, the method further comprises:
denying authentication by facial recognition; and
preventing the computing device from transitioning from a locked state to an unlocked state.

15. The method of claim 1, wherein analyzing the first face template to determine whether the face includes at least one of a removable facial feature that decreases a level of distinctiveness between two faces and a non-removable facial feature that decreases a level of distinctiveness between two faces comprises analyzing the first face template using a facial recognition module, and wherein calculating the similarity score between the first face template of the user in the first image and the enrolled template of the user comprises calculating by the facial recognition module.

16. The method of claim 1, wherein the removable facial feature comprises sunglasses.

17. The method of claim 1, wherein the non-removable facial feature comprises facial hair.

18. The method of claim 1, wherein the second similarity score threshold is greater than the first similarity score threshold.

19. A computing device comprising:
at least one processor;
at least one camera operable by the at least one processor to capture a first image including at least a first face of a user; and at least one output device, wherein the at least one processor is configured to calculate a first face template of the face of the user in the first image,
wherein the at least one processor is configured to analyze the first face template to determine whether the face includes at least one of a removable facial feature that decreases a level of distinctiveness between two faces and a non-removable facial feature that decreases a level of distinctiveness between two faces, wherein analyzing the face template to determine whether the face includes the removable facial feature that decreases the level of distinctiveness between two faces further comprises:
determining, by the at least one processor, a plurality of removable facial feature similarity scores between the face template and a removable facial feature templates; and
calculating, by the at least one processor, a weighted sum of the plurality of removable facial feature similarity scores,
wherein when the weighted sum of the plurality of removable facial feature similarity scores is positive, determining that the face includes the removable facial feature, and
wherein when the weighted sum of the plurality of removable facial feature similarity scores is negative, determining that the face does not include the removable facial feature, wherein when the face includes the removable facial feature, the at least one output device is configured to output a notification for the user to remove the removable facial feature, and wherein when the face includes the non-removable facial feature, the at least one processor adjusts a first similarity score threshold to a second similarity score threshold.

20. A method, comprising:
capturing, by a computing device, an image including at least a face of a user;
calculating, by the computing device, a face template of the face of the user in the image;
analyzing, by the computing device, the face template to determine whether the face includes a non-removable facial feature that decreases a level of distinctiveness between two faces,
wherein analyzing the face template to determine whether the face includes the non-removable facial feature that decreases the level of distinctiveness between two faces further comprises:
determining, by the computing device, a plurality of non-removable facial feature similarity scores between the face template and one or more non-removable facial feature templates; and
calculating, by the computing device, a weighted sum of the plurality of non-removable facial feature similarity scores,
wherein when the weighted sum of the plurality of non-removable facial feature similarity scores is positive, determining that the face includes the non-removable facial feature, and
wherein when the weighted sum of the plurality of non-removable facial feature similarity scores is negative, determining that the face does not include the non-removable facial feature; and
adjusting, by the computing device and in response to determining that the face includes the non-removable facial feature, a first similarity score threshold to a second similarity score threshold.

21. A method, comprising:
capturing, by a computing device, an image including at least a face of a user;
calculating, by the computing device, a face template of the face of the user in the image;
analyzing, by the computing device, the face template to determine whether the face includes a removable facial feature that decreases a level of distinctiveness between two faces,
wherein analyzing the face template to determine whether the face includes the removable facial feature that decreases the level of distinctiveness between two faces further comprises:
determining, by the computing device, a plurality of removable facial feature similarity scores between the face template and a removable facial feature templates; and
calculating, by the computing device, a weighted sum of the plurality of removable facial feature similarity scores,
wherein when the weighted sum of the plurality of removable facial feature similarity scores is positive, determining that the face includes the removable facial feature, and
wherein when the weighted sum of the plurality of removable facial feature similarity scores is negative, determining that the face does not include the removable facial feature; and
outputting, by the computing device and in response to determining that the face includes the removable facial feature, a notification for the user to remove the removable facial feature.

* * * * *